(12) United States Patent
Lucioni

(10) Patent No.: US 8,699,716 B2
(45) Date of Patent: Apr. 15, 2014

(54) CONFERENCE DEVICE AND METHOD FOR MULTI-POINT COMMUNICATION

(75) Inventor: Gonzalo Lucioni, Witten (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 2211 days.

(21) Appl. No.: 10/885,905

(22) Filed: Jul. 7, 2004

(65) Prior Publication Data
US 2005/0018039 A1    Jan. 27, 2005

(30) Foreign Application Priority Data

Jul. 8, 2003   (DE) .................................. 103 30 808

(51) Int. Cl.
*H04R 5/00* (2006.01)

(52) U.S. Cl.
USPC .................... 381/17; 381/310; 379/202.01

(58) Field of Classification Search
USPC ......... 381/17, 310, 61, 14, 1, 89, 119, 77–85, 381/63; 348/14.08, 14.09; 379/202.01
See application file for complete search history.

(56) References Cited

U.S. PATENT DOCUMENTS

| | | | |
|---|---|---|---|
| 5,734,724 A | 3/1998 | Kinoshita et al. | |
| 5,875,233 A * | 2/1999 | Cox ............................ | 379/88.07 |
| 6,011,851 A | 1/2000 | Connor et al. | |
| 6,118,875 A | 9/2000 | Møller et al. | |
| 6,408,327 B1 * | 6/2002 | McClennon et al. ......... | 709/204 |
| 6,611,603 B1 * | 8/2003 | Norris et al. .................. | 381/309 |
| 6,973,184 B1 * | 12/2005 | Shaffer et al. ............ | 379/420.01 |
| 7,012,630 B2 * | 3/2006 | Curry et al. ................ | 348/14.08 |
| 7,116,787 B2 * | 10/2006 | Faller ............................... | 381/17 |
| 7,245,710 B1 * | 7/2007 | Hughes .................... | 379/202.01 |
| 2003/0035553 A1 * | 2/2003 | Baumgarte et al. .......... | 381/94.2 |
| 2003/0081115 A1 | 5/2003 | Curry et al. | |
| 2003/0202665 A1 * | 10/2003 | Lin et al. ......................... | 381/17 |
| 2004/0039464 A1 * | 2/2004 | Virolainen et al. ............ | 700/94 |
| 2004/0138874 A1 * | 7/2004 | Kaajas et al. ................. | 704/205 |

FOREIGN PATENT DOCUMENTS

WO    2004023774 A1    3/2004

* cited by examiner

*Primary Examiner* — Xu Mei
(74) *Attorney, Agent, or Firm* — Buchanan Ingersoll & Rooney PC

(57) ABSTRACT

The conference device (EMCU) according to the invention has several monaural HRTF filters (HRTF1, . . . , HRTFN), each of which is to be allocated to a conference participant. The abbreviation HRTF stands for "Head Related Transfer Function". A corresponding HRTF filter (HRTF1, . . . , HRTFN) is used for filtering a monaural audio signal coming from the conference participant to whom it is allocated. An individual, monaural HRTF filter coefficient set is responsible in this case for defining the filter characteristics of a particular HRTF filter. The conference device (EMCU) also has a conference mixing device (MP) coupled to the HRTF filters (HRTF1, . . . , HRTFN), for mixing the individually filtered audio signals from various conference participants and for transferring the mixed audio signals to conference participants.

17 Claims, 1 Drawing Sheet

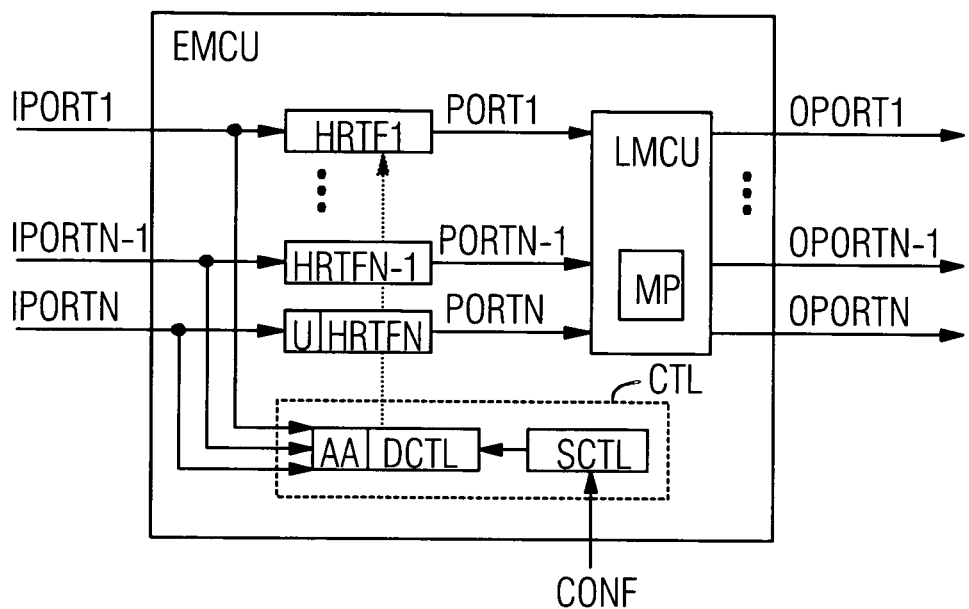

CONFERENCE DEVICE AND METHOD FOR MULTI-POINT COMMUNICATION

CROSS-REFERENCE TO RELATED APPLICATIONS

This application claims priority to the German application No. 10330808.3, filed Jul. 8, 2003 and which is incorporated by reference herein in its entirety.

FIELD OF INVENTION

The invention relates to a conference device and a method for multi-point communication

BACKGROUND OF INVENTION

Modern communication systems are becoming increasingly characterized by the networking of different technologies, transmission methods and transmission media. In non-homogeneous communication systems such as these, the transmission quality—and, in particular, the quality of voice transmission—is influenced to a significant degree by the particular communication network technology used, the transmission conditions in specific networks (e.g. in radio networks), or by handovers between different communication networks. Often, connections are fed at least partially via mobile radio networks with relatively low bandwidth and correspondingly poor voice transmission quality. In conference systems in particular, such differences in voice transmission quality in non-homogeneous communication systems can greatly diminish the intelligibility and distinguishability of conference participants.

SUMMARY OF INVENTION

The object of the invention is to propose a conference device and a method for multi-point communication, whereby the intelligibility and distinguishability of conference participants during voice rendition is improved.

This object is achieved by the claims.

Advantageous embodiments and developments of the invention are specified in the dependent claims.

The conference device according to the invention has a number of monaural HRTF filters, each of which is to be allocated to a conference participant. The abbreviation HRTF stands for "Head Related Transfer Function". Each HRTF filter is used for filtering a monaural audio signal coming from the conference participant to whom it is allocated. An audio signal is defined here and in the following as a transmission signal for transmitting a data representation of an audio signal. The filter characteristics of each HRTF filter are defined by an individual, monaural HRTF filter coefficient set allocated to the filter. The conference device also has a conference-mixing device coupled to the HRTF filter, for mixing the individually filtered audio signals from different conference participants and for transferring the mixed audio signals to conference participants.

A Head Related Transfer Function (HRTF) represents a correlation between the sound pressure $p(t)$ ($t$: time coordinate) at the sound source location, and the sound pressure thus created $x(t)$ in the human inner ear. The sound pressure process in the inner ear differs characteristically from the sound pressure process at the sound source location, since a sound signal is subjected to numerous reflections and/or deflections in the ear, head and body, as it travels to the inner ear. The correlation between the sound pressure at the sound source and the sound pressure in the inner ear can be represented by means of an impulse response $h(\tau)$, as follows:

$$x(t) = \int h(\tau) * p(t-\tau) d\tau$$

The impulse response $h(\tau)$ is often also referred to as "Head Related Impulse Response" (HRIR). The Head Related Transfer Function (HRTF) is often represented by the Fourier transform of $h(\tau)$ i.e. by the corresponding spectral transmission function.

Each HRTF filter of the conference device according to the invention artificially simulates, in a representative manner, a signal adjustment which is experienced by a sound signal traveling from the sound source to the inner ear.

With the help of an HRTF for both the left ear and the right ear, binaural audio signals can be synthesized from a monaural audio signal. These binaural audio signals, when perceived by both ears, create an accurate spatial auditory impression. The term binaural is used in this context, like the usual term "stereo", to indicate a differentiation between the left and right ear, whilst monaural ("mono") indicates the absence of such differentiation.

Binaural filtering of audio signals requires two audio channels and two suitably positioned playback loudspeakers for each audio signal. However, in conventional communication systems, and in conference systems in particular, dual-channel audio transmissions are not usually provided, and binaural HRTFs therefore cannot normally be used to advantage in these systems.

With limitations, however, a directional auditory impression can also be virtually simulated using monaural HRTFs, i.e. to some extent by tone coloration of audio signals. In this way, sources of monaural audio signals can be virtually positioned in different directions of a so-called median plane, with regard to the auditory impression of the filtered audio signals, by means of HRTF filters provided with individual HRTF filter coefficient sets. The term median plane is normally used to describe the perpendicular plane on the connecting axis of the two ears.

Unlike binaural HRTF filters, monaural HRTF filters can be used in common, monaurally-based communication systems without substantial modifications. Monaural HRTF filters can also be easily integrated into conventional monaural conference devices.

Because of the virtual positioning of conference participants in different directions of the median plane, it becomes much easier to differentiate between the conference participants particularly when they speak at the same time. In addition, the intelligibility of any selected conference participant is significantly improved by positioning the said conference participant virtually in a direction in which the voice intelligibility is better from the listener's perspective. At the median plane, for example, this direction is in the direct line of sight.

A filter control is preferably provided for the static or dynamic allocation of an individual HRTF filter coefficient set to an HRTF filter and/or for the allocation of an HRTF filter to a conference participant. The HRTF filter coefficient sets to be allocated may be selected, generated or configured statically or dynamically according to various criteria. The allocation may be effected depending on a conference control or depending on the requirements of conference participants.

According to an advantageous development of the invention the filter control may have an audio analysis device for analyzing audio signals from conference participants, said device being set up so that the allocation is carried out depending on the result of the analysis.

Analysis of the audio signals and analysis-dependent allocation make it possible, for example, for a conference chairperson to be virtually separated from the other conference participants with regard to the auditory impression, and thus to be virtually positioned, so to speak, in the center of the field of perception, whilst other conference participants are virtually positioned in the background in terms of the perceived sound.

According to an advantageous embodiment of the invention, the HRTF filter coefficient sets are matched specifically to a transmission bandwidth of the conference device and/or to a transmission bandwidth of terminals to be involved in a conference. HRTF filter coefficient sets of this type may, for example, be produced such that—in the case of limited transmission bandwidths—they create a similar perception of acoustic direction in terms of auditory impression as do HRTF filter coefficient sets calculated for the entire acoustic frequency range.

Furthermore, it is possible for different HRTF filter coefficient sets to be provided for specific participants, terminals, connections, networks and/or conference statuses.

According to an advantageous development of the invention, the conference device may have a converter for converting a binaural audio signal coming from a binaural conference participant into a monaural audio signal to be filtered by one of the monaural HRTF filters. Using such a converter, it is possible also for binaural conference participants, i.e. conference participants having at least two audio channels available, to be included in a conference with monaural conference participants.

Such a conference between monaural and binaural conference participants may be implemented, for example, in that two separate conference connections—one monaural and the other binaural—are set up by the conference device. If there are x monaural and y binaural conference participants, the monaural conference includes x+y monaural incoming participants and x outgoing participants, whilst the binaural conference has x+y binaural incoming participants and y outgoing participants. In the binaural conference circuit the audio signals of the x monaural conference participants are to be filtered by means of binaural HRTF filters in order to obtain an auditory impression comparable to that of the binaural conference participants. Accordingly, in the monaural conference the audio signals of the y binaural participants must each be converted into a monaural audio signal by means of the converter.

The converter is preferably configured such that a virtual position of the binaural conference participant defined by an auditory impression of the binaural audio signal is converted into a monaural HRTF filter coefficient set for the relevant HRTF filter. This filtering causes the binaural conference participant to be virtually positioned in the median plane. In this way a virtual audio source position indicated by a binaural audio signal in the three-dimensional space can be mapped to a suitable position in the two-dimensional median plane.

An exemplary embodiment of the invention is explained in greater detail below on the basis of the diagram.

BRIEF DESCRIPTION OF THE DRAWING

The sole FIGURE is a schematic illustration of a conference device according to the invention.

DETAILED DESCRIPTION OF INVENTION

The diagram schematically illustrates a conference device EMCU that has been expanded by HRTF filter functions (HRTF=Head Related Transfer Function). The functions of the conference device EMCU in the exemplary embodiment include mixing communication signals, e.g. voice, audio, video and/or multimedia signals from various conference participants, and distributing the mixed communication signals to the conference participants, so that each conference participant receives the communication signals coming from the other conference participants. The conference device EMCU may be a line-oriented or a packet-oriented conference device. In a packet-oriented embodiment, communication signals also include packet-based media streams such as voice, audio, video and/or multimedia data packet streams. For reasons of clarity, only communication signals in the form of audio signals, e.g. voice or tone signals, are considered below. A transmission signal for transmitting a data representation of an audio signal is also described as an audio signal for this purpose, in accordance with normal usage.

The conference device EMCU has N input ports IPORT1, ..., IPORT-1, IPORTN, for receiving an audio signal or audio channel coming from each conference participant, and N output ports OPORT1, ..., OPORT-1, OPORTN for outputting the mixed audio signals or audio channels to the conference participants.

In order to control a conference circuit and implement the mixing function, the conference device EMCU contains a conventional conference unit LMCU, which is preferably configured as a standard MCU (MCU=Multipoint Control Unit) according to ITU-T Recommendation H.323. The conference unit LMCU has a multipoint processor unit MP which is preferably implemented according to the H.323 recommendation, said multipoint processor unit being used as a conference mixing device for mixing the audio signals or audio channels coming from the conference participants and for transferring the mixed audio signals or audio channels to the conference participants. The conference unit LMCU has internal input ports PORT1, ..., PORT-1, PORTN, whilst its output ports are identical to the output ports OPORT1, ..., OPORT-1, OPORTN.

The ports IPORT1, ..., IPORT-N, PORT1, ..., PORTN, OPORT ..., OPORTN are each allocated to an audio media channel. In this exemplary embodiment the ports IPORT1, ..., IPORT-1, PORT1, ..., PORTN, OPORT1, ..., OPORTN each correspond to an individual monaural "mono" audio channel for monaural audio signals and the input port IPORTN corresponds to a binaural "stereo" dual audio channel for binaural audio signals.

According to the invention the conference device EMCU has N monaural HRTF filters HRTF1, ..., HRTFN-1, HRTFN, which are preferably implemented as digital impulse response filters. The filter inputs of the HRTF filters HRTF1, ..., HRTFN-1 are each coupled with one of the input ports IPORT1, ..., IPORTN-1 of the conference device EMCU. The filter input of the HRTF filter HRTFN is coupled with the input port IPORTN via a converter U. In this way each conference participant is allocated one of the HRTF filters HRTF1, ..., HRTFN, by allocation of an input port IPORT1, ..., IPORTN.

The converter U is used for converting a binaural audio signal received from a binaural conference participant via the input port IPORTN into a monaural audio signal to be filtered by the monaural HRTF filter HRTFN. The converter U allows binaural conference participants, i.e. conference participants having two audio channels, also to be included in a conference with monaural conference participants.

The filter outputs of the HRTF filters HRTF1, ..., HRTFN are coupled via the ports PORT1, ..., PORTN to the conference unit LMCU, in order for the filtered audio signals from the conference participants to be mixed by the multi-point processor MP of the conference unit LMCU and for the mixed audio signals to be distributed to the conference participants via the output ports OPORT1, ..., OPORTN.

Each of the HRTF filters HRTF1, ..., HRTFN has an individual monaural HRTF filter coefficient set which defines the filter characteristics of the corresponding HRTF filter, i.e. its frequency-dependent amplitude attenuation and phase shift. A monaural HRTF filter coefficient set is preferably implemented as a set of discrete impulse response coefficients or parameters. In order to filter a monaural audio signal the impulse response coefficients are continuously multiplied by sample values of the audio signal, in accordance with a mathematical convolution, by means of a digital signal processor, and the products are added preferably using recursive digital filters known as IIR (Infinite Impulse Response) filters.

Preferably, such HRTF filter coefficient sets are selected or generated, that are specifically matched to the limited transmission bandwidths of the conference device EMCU and/or to the limited transmission bandwidths of terminals of conference participants. Such HRTF filter coefficient sets may be constructed or generated such that their convolution with the sample values of an audio signal corresponds to the superimposition of one or more time-delayed and possibly tone-colored copies of the audio signal. Such deferred superimposition enables reflections, to which an audio signal is subjected as it travels from the sound source via the outer ear to the inner ear, to be artificially simulated. In this way a corresponding HRTF filter coefficient set may, to a certain extent, be assembled or constructed from individual reflections, which may be selected according to physical and/or physiological conditions. The HRTF filter coefficient sets are preferably constructed in this way and are allocated to the HRTF filters HRTF1, ..., HRTFN, and thus to the conference participants, such that the conference participants are virtually positioned in different directions of the median plane with regard to the auditory impression of the filtered audio signals, so that they can be differentiated as clearly as possible by each listener.

Practical trials show that, in order to achieve a good level of differentiation and a subjective improvement in the intelligibility of conference participants, artificially constructed HRTF coefficient sets with a relatively low number of 10-40 coefficients, are already sufficient in the bandwidth range of conventional telecommunication systems. The low number of HRTF filter coefficient sets required means that the computer outlay necessary for digital filtering is greatly reduced. Conventional HRTF filter coefficient sets, which are not usually constructed but are derived from acoustic measurements, normally contain considerably more filter coefficients (approx. 128-512).

The conference device EMCU also has a filter control CTL for allocating an individual HRTF filter coefficient set to a particular HRTF filter HRTF1, ..., HRTFN and/or for allocating a particular HRTF filter HRTF1, ..., HRTFN to a conference participant. The filter control CTL can allocate specified HRTF filter coefficient sets and/or dynamically generated HRTF filter coefficient sets to the HRTF filters HRTF1, ..., HRTFN. The filter control CTL has a static control SCTL for the static allocation of HRTF filter coefficients to the HRTF filters HRTF1, ..., HRTFN, and a dynamic control DCTL for dynamic allocation.

The filter control CTL also has an audio analysis device AA connected to the dynamic control DCTL, said audio analysis device being coupled to the input ports IPORT1, ..., IPORTN. The audio analysis device AA is used for analyzing the audio signals of the conference participants, in order to control the allocation of the HRTF filter coefficient sets to the HRTF filters HRTF1, ..., HRTFN, via the dynamic control DCTL, depending on the result of the analysis. In this way the filter control CTL can allocate dynamically changing HRTF filter coefficient sets to the HRTF filters HRTF1, ..., HRTFN according to specific memories, chairpersons and/or participants. By means of the static control SCTL coupled to the dynamic control DCTL, the HRTF filter coefficients and/or the HRTF filters HRTF1, ..., HRTFN can be statically configured and preset. The static control SCTL has an external configuration input CONF for this purpose.

The invention claimed is:

1. A conference device, comprising:
   a plurality of monaural HRTF filters each HRTF filter allocated to a different conference participant, each filter for filtering an input monaural audio signal, an output of the monaural HRTF filter comprising an output monaural audio signal, wherein each monaural HRTF filter comprises a different monaural HRTF filter coefficient set for defining filter characteristics of that filter and each filter coefficient set is configured to provide a different directional auditory impression that virtually positions each one of the allocated conference participants in a different direction relative to a median plane; and
   a conference mixing device coupled to the HRTF filters for mixing the output monaural audio signal of different conference participants and for transferring the mixed audio monaural signals to conference participants over a communications system such that the transferred monaural signals provide a different directional auditory impression that virtually positions each one of the allocated conference participants in a different direction relative to the median plane.

2. A conference device according to claim 1, further comprising an audio analysis device for analyzing an audio signal from each conference participant connected to each HRTF filter, and wherein the selected HRTF filter coefficient set is responsive to a result of the audio analysis; and
   wherein each one of the individual HRTF filter coefficient sets is selected such that each conference participant is virtually positioned in a different direction relative to the median plane in terms of an auditory impression of the filtered audio signals.

3. A conference device according to claim 1, further comprising:
   an audio analysis device for analyzing an audio signal from each conference participant connected to each HRTF filter, and wherein the selected HRTF filter coefficient set is responsive to a result of the audio analysis; and
   a filter control responsive to the audio analysis device for allocating an individual HRTF filter coefficient set to an HRTF filter and/or for allocating an HRTF filter to a conference participant.

4. A conference device according to claim 2, further comprising:
   an audio analysis device for analyzing an audio signal from each conference participant connected to each HRTF filter, and wherein the selected HRTF filter coefficient set is responsive to a result of the audio analysis; and
   a filter control responsive to the audio analysis device for allocating an individual HRTF filter coefficient set to an HRTF filter and/or for allocating an HRTF filter to a conference participant.

5. A conference device according to claim 1, wherein the HRTF filter coefficient sets are matched to a transmission bandwidth of the conference device and/or to a transmission bandwidth of terminals of participants to be involved in a conference.

6. A conference device according to claim 2, wherein the HRTF filter coefficient sets are matched to a transmission bandwidth of the conference device and/or to a transmission bandwidth of terminals of participants to be involved in a conference.

7. A conference device according to claim 3, wherein the HRTF filter coefficient sets are matched to a transmission bandwidth of the conference device and/or to a transmission bandwidth of terminals of participants to be involved in a conference.

8. A conference device according to claim 1, wherein different HRTF filter coefficient sets are provided for at least one of specific participants, terminals, connections, networks and conference statuses.

9. A conference device according to claim 2, wherein a different HRTF filter coefficient set is provided for each specific participant, terminal, connection, network or conference status.

10. A conference device according to claim 3, wherein different HRTF filter coefficient sets are provided for at least one of specific participants, terminals, connections, networks and conference statuses.

11. A conference device according to claim 5, wherein a different HRTF filter coefficient set is provided for each specific participant, terminal, connection, network or conference status.

12. A conference device according to claim 1, further comprising:
a converter coupled to at least one of the HRTF filters, the converter configured for converting a binaural audio signal received from a binaural conference participant into the input monaural audio signal for filtering by the HRTF filter allocated to that conference participant.

13. A conference device according to claim 2, further comprising:
a converter connected to an HRTF filter, the converter configured for converting a binaural audio signal received from a binaural conference participant into the input monaural audio signal for filtering by the HRTF filter to which the converter is connected, the HRTF filter connected to the converter being allocated to the binaural conference participant.

14. The conference device of claim 12 wherein the device is configured to establish at least two separate conference connections, a first conference connection being for at least one monaural audio participant and a second conference connection being for at least one binaural audio participant, and the converter is configured to convert the binaural signals of the at least one binaural participant into monaural signals for filtering.

15. A conference device, comprising:
several monaural HRTF filters each to be assigned to a different conference participant, each filter for filtering an input monaural audio signal received or converted from the particular assigned conference participant, an output of each monaural HRTF filter comprising an output monaural audio signal, a different monaural HRTF filter coefficient set being allocated to each HRTF filter for defining the filter characteristics of that filter and each filter coefficient set being selected to provide a different directional auditory impression that virtually positions each one of the allocated conference participants in a different direction relative to a median plane;
an audio analysis device for analyzing an audio signal from each conference participant, the audio analysis device connected to each HRTF filter, and wherein each HRTF filter coefficient set is responsive to a result of the audio analysis; and
a conference mixing device operatively connected to the HRTF filters for mixing the output monaural audio signals of different conference participants and for transferring the mixed output monaural audio signals to conference participants over a communications system such that the transferred monaural signals provide a different directional auditory impression that virtually positions each one of the allocated conference participants in a different direction relative to the median plane, wherein each selected HRTF filter coefficient set is further responsive to a transmission bandwidth of the communications system.

16. A method for multi-point communication, comprising:
analyzing an audio signal from each conference participant;
allocating a monaural HRTF filter with an individual HRTF filter coefficient set that defines the filter characteristics of the HRTF filter to each conference participant in response to the step of analyzing, wherein each filter coefficient set is selected to provide a different directional auditory impression that virtually positions each one of the allocated conference participants in a different direction relative to a median plane;
filtering an input monaural audio signal derived or received from a conference participant by the monaural HRTF filter allocated to that conference participant, wherein a signal produced by the filtering step comprises an output monaural audio signal;
mixing the individually filtered output monaural audio signals of different conference participants; and
transferring the mixed monaural audio signals to conference participants over a communications system such that the transferred monaural signals provide a different directional auditory impression that virtually positions each one of the allocated conference participants in a different direction relative to the median plane, wherein each selected HRTF filter coefficient set is further responsive to a transmission bandwidth of the communications system.

17. A method according to claim 16, further comprising:
identifying a conference participant as a chairperson, wherein the identified chairperson is virtually separated from other conference participants with regard to the auditory impression of the output monaural audio signals.

* * * * *